Feb. 10, 1925.
C. F. JENKINS
1,525,550
FLEXING MIRROR
Filed Oct. 31, 1922
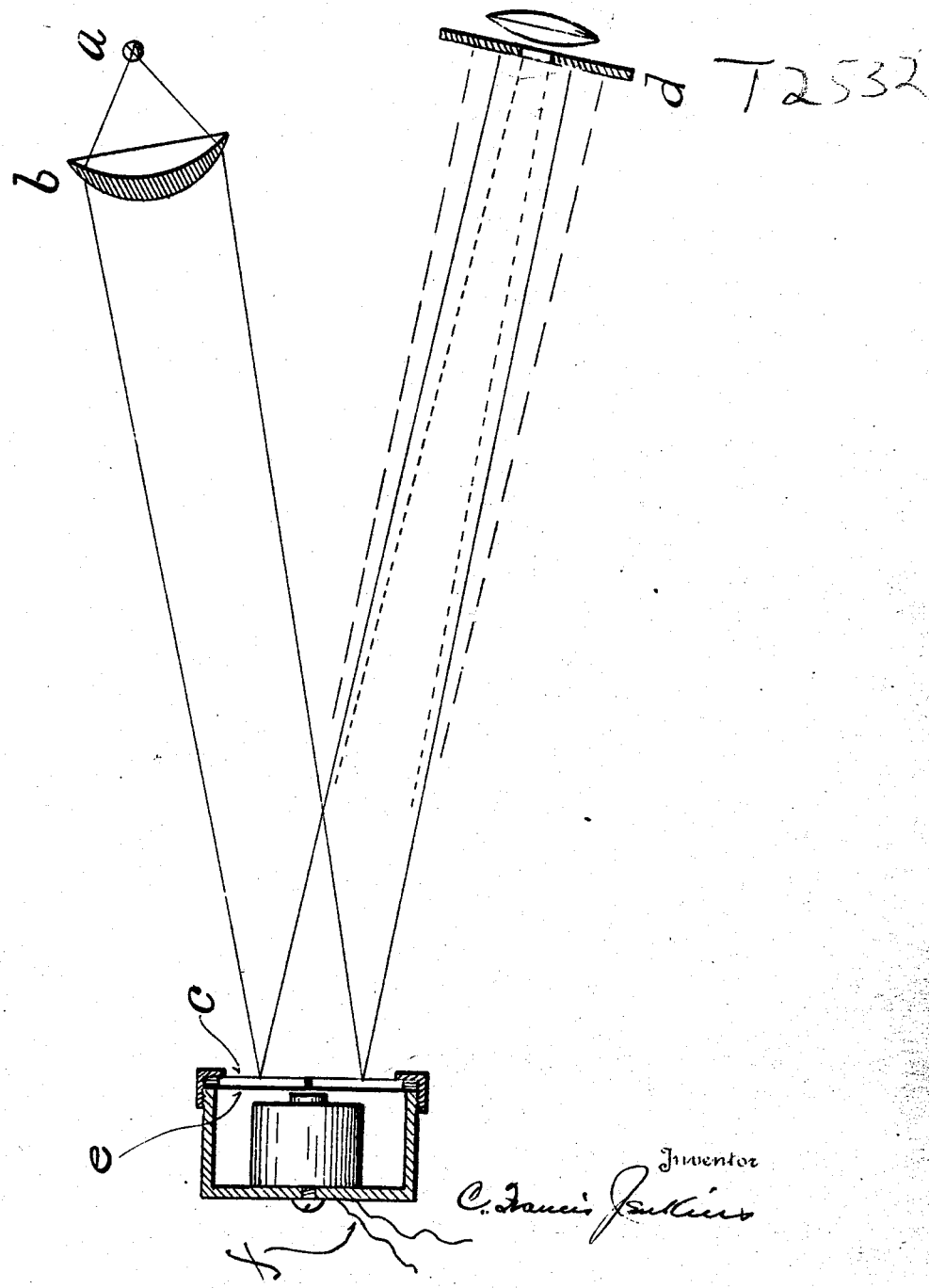

Patented Feb. 10, 1925.

1,525,550

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

FLEXING MIRROR.

Application filed October 31, 1922. Serial No. 598,145.

*To all whom it may concern:*

Be it known that I, CHARLES FRANCIS JENKINS, citizen of the United States, residing at Washington, District of Columbia, have invented certain new and useful Improvements in a Flexing Mirror, of which the following is a specification.

This invention relates to apparatus for receiving pictures-by-radio, and has for its principal object means for varying, with a fluctuating current, the intensity of the light falling on a given area.

In the figure, A is a light source; B a lens for gathering the diverging rays of the light source and directing them onto mirror C, from which the light is reflected to an apertured disc D, with a transparent or translucent light aperture therein. The glass mirror C, which may be a strip, a disc, or other shape most suitable for the purpose, is attached to an iron diaphragm E located adjacent to the poll piece of an electric magnet having leads F.

The beam of light directed on the mirror, and from there reflected to the mask D has its boundary shown by solid lines in the drawing. This is the boundary when the diaphragm is in inactive or neutral position.

When the iron diaphragm is pulled down by current in the leads F, the boundary of the beam of light between the mirror E and the mask D will be more concentrated, as shown by the dotted lines, because the mirror is concave. However, when the diaphragm is repelled over the poll of the magnet by current of opposite sign in the leads F, the mirror will be made convex, and the beam reflected therefrom will be wider, as shown bounded by the dash lines. The effect then of a pulsating or alternating current in the leads F is to cause the cross section of the beam of light, where it falls on the mask, to have greater or lesser area. As the area is lessened the intensity over unit area is obviously increased, and if the area considered is that in the middle of the mask D, it is just as obvious that this area will fluctuate in strength of illumination in accord with the amplitude of vibration of the mirror.

This then is the object sought, namely, means for increasing or decreasing the intensity of the illumination of a given area to correspond to the fluctuation in the current strength of the leads F.

It is not thought necessary to lengthen this description by explaining in detail how the fluctuating current in the leads F follows the light values of pictures being sent from a broadcasting station and picked up in a receiving station, of which this device is a part, or how the changing intensity of this spot on the mask D is imaged on a photographic plate in this process of transmitting pictures-by-radio, as such attachments are no part of this invention, although modifications thereof are made the subject of another application.

What I claim therefore as my invention, and wish to secure by Letters Patent of the United States, is:

In apparatus of the class described, a light source, a flexible mirror located to reflect light from said source, an electro-magnet and its armature, the armature being attached to the mirror, a lens in alignment with the axis of the reflected light, and an apertured mask between the lens and light source, the area of the aperture being but a fraction of the area of the adjacent surface of said lens.

In testimony whereof I have affixed my signature.

CHARLES FRANCIS JENKINS.